United States Patent [19]
Watada

[11] Patent Number: 6,012,641
[45] Date of Patent: Jan. 11, 2000

[54] LAMINATED STRETCHED AND UNSTRETCHED POLYESTER CARD FOR IC CARD

[75] Inventor: Hisataro Watada, Kyoto, Japan

[73] Assignees: Watada Printing Co., Ltd., Kyoto; Nagase & Co., Ltd., Osaka, both of Japan

[21] Appl. No.: 08/753,780

[22] Filed: Dec. 2, 1996

[30] Foreign Application Priority Data

Dec. 6, 1995 [JP] Japan .................................. 7-344793

[51] Int. Cl.⁷ .................................................. G06K 19/00
[52] U.S. Cl. ........................ 235/488; 235/457; 235/492
[58] Field of Search ................... 235/488, 487, 235/492

[56] References Cited

U.S. PATENT DOCUMENTS

| | | | |
|---|---|---|---|
| 4,198,458 | 4/1980 | Mitsuishi et al. | 428/212 |
| 4,417,413 | 11/1983 | Hoppe et al. | 235/488 |
| 4,563,575 | 1/1986 | Hoppe et al. | 235/492 |
| 4,639,585 | 1/1987 | Haghiri-Tehrani et al. | 235/492 |
| 4,841,134 | 6/1989 | Hida et al. | 235/488 |
| 4,973,515 | 11/1990 | Otonari et al. | 428/315.5 |
| 5,045,384 | 9/1991 | Otonari | 428/218 |
| 5,049,728 | 9/1991 | Rovin | 235/492 |
| 5,171,625 | 12/1992 | Newton | 428/195 |
| 5,206,084 | 4/1993 | Takeda et al. | 428/336 |
| 5,413,849 | 5/1995 | Austin et al. | 428/293 |
| 5,418,208 | 5/1995 | Takeda et al. | 503/227 |
| 5,424,119 | 6/1995 | Phillips et al. | 428/328 |
| 5,466,535 | 11/1995 | Higgins et al. | 428/483 |
| 5,476,629 | 12/1995 | Yabe et al. | 264/328.7 |
| 5,783,024 | 7/1998 | Forkert | 156/351 |

*Primary Examiner*—Anita Pellman Gross
*Assistant Examiner*—Douglas X. Rodriguez
*Attorney, Agent, or Firm*—Frishauf, Holtz, Goodman, Langer & Chick, P.C.

[57] ABSTRACT

A plastic card prepared by laminating unstretched polyester sheets to both sides of a single sheet or a laminate of a plurality of sheets of a stretched polyester film, cutting the obtained laminate to a shape of a card, and forming a cavity for embedding a chip module by milling in the laminate cut to the shape of a card. The plastic card is excellent in mechanical strength, dimensional stability, heat resistance, and property for printing, contains no hazardous halogen elements, and has a cavity for embedding a chip module which is formed without formation of burr by milling.

3 Claims, 2 Drawing Sheets

LAMINATED STRETCHED AND UNSTRETCHED POLYESTER CARD FOR IC CARD

FIELD OF THE INVENTION

The present invention relates to a plastic card. More particularly, the present invention relates to a plastic card made of a polyester which enables beautiful printing, is excellent in heat resistance, shows a large mechanical strength, has a cavity for embedding a chip module which is formed without formation of burr by milling, and contains no hazardous halogen elements.

PRIOR ART OF THE INVENTION

As the general use recording medium of a portable type, recording paper, plastic cards, magnetic cards, and the like are used. As the medium which is generally carried along, cards having a size of a business card, such as credit cards, are most widely used. Telephone cards and other prepaid cards can be applied to limited fields and do not have interchangeability supported by standards. As the card having the interchangeability, credit cards of plastic cards and bank cards of magnetic cards are widely used. However, magnetic cards have a memory size too small for use in automatic data processing and are also inferior in security. Therefore, IC cards are becoming more widely used as the card which has a large memory size and is superior in security because recording and displaying of data can be set under protect.

On a magnetic card, a magnetic stripe is formed to record necessary information, and the name and the number of the owner are frequently embossed to facilitate business treatments. Because the property for embossing is required for the material used for a magnetic card, a polyvinyl chloride resin or a vinyl chloride-vinyl acetate copolymer resin having the suitable property for ordinary embossing is frequently used as the material for a magnetic card. However, because IC cards can record a very large amount of information, the property for embossing is not always required. Instead, consumers generally tend to require a material which is excellent in physical properties, such as mechanical properties, dimensional stability, and heat resistance, has a superior property for printing which is related to beautiful appearance, and contains no hazardous halogen elements.

However, macromolecular materials having excellent physical properties generally have drawbacks in that the property for printing is inferior to that of polyvinyl chloride resins and that working is difficult because of formation of burr in punching and milling.

SUMMARY OF THE INVENTION

The present invention accordingly has an object to provide a plastic card excellent in mechanical strength, dimensional stability, heat resistance, and property for printing, containing no hazardous halogen elements, and having a cavity for embedding a chip module which is formed without formation of burr by milling.

As the result of extensive investigations undertaken by the present inventors to achieve the above object, it was discovered that a material prepared by laminating unstretched polyester sheets on both sides of a single sheet or a laminate of a plurality of sheets of a stretched polyester film has excellent physical properties and property for printing and does not cause formation of burr in working. The present invention has been completed on the basis of the discovery.

Accordingly, the present invention provides:

(1) A plastic card prepared by laminating unstretched polyester sheets to both sides of a single sheet or a laminate of a plurality of sheets of a stretched polyester films, cutting the obtained laminate to a shape of a card, and forming a cavity for embedding a chip module by milling in the laminate cut to the shape of a card.

Preferable embodiments of the present invention include:

(2) A plastic card described in (1) wherein the unstretched polyester sheets are laminated to both sides of a single sheet or a laminate of two or three sheets of the stretched polyester sheets; and (3) A plastic card described in any of (1) and (2) wherein the unstretched polyester sheet is transparent.

Figure 1:
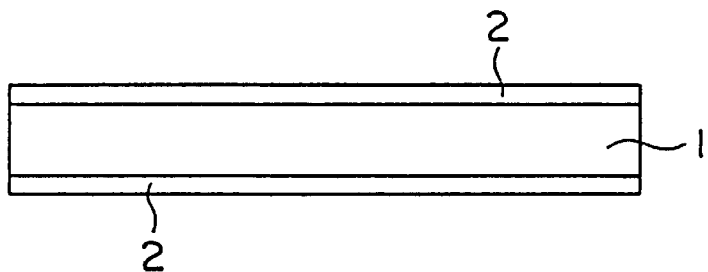
FIG. 1 shows a side view of an embodiment of the plastic card of the present invention.

The numbers in the figures have the meanings as listed in the following:

1: a stretched polyester film
2: an unstretched polyester sheet
3: a plastic card cut by punching
4: a cavity for embedding a chip module formed by milling

DETAILED DESCRIPTION OF THE INVENTION

The plastic card of the present invention is used by embedding a chip module into the cavity for embedding a chip module which is formed milling at the surface of the card. The chip module embedded into the cavity is not particularly limited. For example, an IC chip module used for writing, memorizing, or reading information, a perfume chip containing various types of perfume which are slowly discharged, and the like can be used. When an IC chip module is inserted, the IC chip module is embedded in such a position that the external terminals of IC (an integrated circuit) module are placed at the surface of the card. The size of the plastic card of the present invention is not particularly limited. The card of the present invention may have a specifically designed size. The card of the present invention may also have a size in accordance with Japanese Industrial Standard X 6303, i.e., a width of 53.92 to 54.03 mm, a length of 85.47 to 85.72 mm, and a thickness of 0.68 to 0.84 mm, to provide the interchangeability so that the card can generally be used.

The material of the card of the present invention is prepared by laminating unstretched polyester sheets to both sides of a single sheet or a laminate of a plurality of sheets of a stretched polyester films which is printed on one or both surfaces thereof where necessary. The order of lamination of the stretched polyester film and printing on the stretched polyester film is not particularly limited. For example, the single sheet or the laminate of a plurality of sheets of the stretched polyester film may be printed on one or both of the surfaces thereof. In another way, when the laminate of a plurality of sheets of the stretched polyester film is used, the constituting sheets may be printed before the lamination on one or both surfaces which are designated to become the surfaces of the laminate and thereafter put together to prepare the laminate.

Examples of the stretched polyester film used in the present invention include biaxially stretched films of polyethylene terephthalate, biaxially stretched films of polyethylene naphthalate, and the like. The biaxially stretched film of polyethylene terephthalate or polyethylene naphthalate can be obtained by extruding polyethylene terephthalate or polyethylene naphthalate, respectively, from a T-die, followed by stretching the extruded film to the longitudinal and transverse directions consecutively or simultaneously and then fixing by heating.

The unstretched polyester sheet used in the present invention is not particularly limited. For example, the unstretched polyester sheet can be obtained by extruding a crystallizable polyester, such as polyethylene terephthalate, from a T-die into a sheet for, followed by rapidly cooling the extruded film by a cooling roll. The unstretched polyester sheet can also be obtained by extruding an amorphous polyester obtained by copolymerization of ethylene glycol, terephthalic acid, and another glycol component or another dibasic acid component from a T-die into a sheet form, followed by cooling without stretching. Among these unstretched polyester sheets, the unstretched polyester sheet obtained by using the amorphous polyester can advantageously be used because of superior stability of the product. Examples of the commercially available amorphous polyester sheet include PET-G produced by EASTMAN Corporation which is a polyester obtained by copolymerization of ethylene glycol, 1,4-cyclohexanedimethanol, and terephthalic acid.

As the stretched polyester film of the present invention, a single sheet or a laminate of a plurality of sheets can be used. The number of sheet in the laminate is not particularly limited. When the printing process on one or both surfaces of the card is taken into consideration, a laminate containing 2 to 3 sheets is preferable. When 4 or more sheets of the stretched polyester film are laminated, the properties of the obtained plastic card are not particularly improved while the process for producing the plastic card is more complicated. The thickness of the part of the stretched polyester film is decided by subtracting the thickness of the unstretched polyester sheets from the required thickness of the plastic card. When the plastic card of the present invention is used as the substrate of an IC card, it is preferred that the thickness is 0.68 to 0.84 mm. In this case, when the thickness of the unstretched polyester sheet is 10 to 200 $\mu$m and 2 to 3 sheets of the stretched polyester film are laminated, the required thickness of one sheet of the stretched polyester film is 140 to 410 $\mu$m. A polyester film having such a thickness can easily be prepared by a conventional process.

In the present invention, the method of lamination of the stretched polyester film and the unstretched polyester sheet is not particularly limited. For example, the stretched polyester film and the unstretched polyester sheet can be laminated together with an adhesive or by heat sealing. When the unstretched polyester sheet and the stretched polyester film are treated on the surfaces, the adhesive strength can be increased, and the property for printing can be improved. The method of the surface treatment is not particularly limited. For example, the surface can be treated by the corona discharge or by dipping into an aqueous solution of sodium hydroxide. As the adhesive, for example, a solution type adhesive or an emulsion type adhesive containing a thermoplastic resin can be used. When an adhesive is used, it is necessary that a sufficient care be taken to suitably select the type of the adhesive, the process for coating, and the thickness of the coating layer in order to prevent deformation of the produced plastic card. When the stretched polyester film and the unstretched polyester sheet are laminated together by heat sealing, the process for the heat sealing is not particularly limited, and a conventional process can be used. The ultrasonic wave sealing or the impulse sealing is preferably used.

In the present invention, the order of lamination of sheets of the stretched polyester film and the unstretched polyester sheet is not particularly limited. For example, after a plurality of sheets of the stretched polyester film are laminated together, the unstretched polyester sheets are laminated to both sides of the obtained laminate. As another method, a plurality of sheets of the stretched polyester film are inserted between two unstretched polyester sheets, and the obtained combination is laminated together. When the plastic card is printed, it is preferred that, after a plurality of sheets of the stretched polyester film are laminated together, one or both sides of the obtained laminate are printed, and then unstretched polyester sheets are laminated to both sides of the printed laminate. It is also possible that one or both of the unstretched polyester sheets are printed on the inner side thereof and then laminated to the laminate of a plurality of sheets of the stretched polyester film. The method of printing is not particularly limited. For example, the gravure printing, the flexographic printing, the silk screen printing, the offset printing, or the like can be used. Among these methods, the offset printing is preferably used. Stretched polyester films and unstretched polyester sheets have excellent property for printing and can be printed almost as beautifully as polyvinyl chloride resin sheets. When the surface for printing is treated in advance by a suitable treatment, such as the corona discharge treatment or the dipping treatment into an aqueous solution of sodium hydroxide, more excellent property for printing can be achieved.

Because the plastic card of the present invention is prepared by laminating the unstretched polyester sheets on both sides of a single sheet or a laminate of a plurality of sheets of a stretched polyester film, press working is not required, and the produced card exhibits beautiful mirror gloss without any further treatment. When the stretched polyester film is printed, it is generally preferred that the unstretched polyester sheet is colorless and transparent. However, a colored transparent unstretched polyester sheet or an unstretched polyester sheet treated by using a mat may also be used in order to achieve special aesthetic effects. An unstretched polyester sheet which is not transparent may also be used where necessary.

The plastic card of the present invention is formed into a desired shape by cutting the laminate of the stretched polyester film and unstretched polyester sheet. The shape is not particularly limited. When the card is used as a substrate of an IC card, it is preferred for providing the interchangeability that the card is cut into the shape in accordance with Japanese Industrial Standard X 6303, i.e., a width of 53.92 to 54.03 mm, a length of 85.47 to 85.72 mm, and a beveling of 3.00 to 3.18 at the corners. The method of cutting is not particularly limited. Cutting by a blade, with abrasives, by shearing, by heating, or by electric discharge can be conducted. Because the material of the plastic card of the present invention has excellent workability, the laminate can be efficiently cut by punching which is a method of cutting by shearing. When the laminate is cut by punching, a beautiful cutting can be achieved without formation of burr when a tapered shape is formed at the lower part of the upper tool, and the upper tool is brought slowly into contact with the lower tool.

In the plastic card of the present invention, a cavity for embedding a chip module is formed by milling. The method of milling is not particularly limited. For example, the milling can advantageously be conducted by using a multi-spindle drilling machine. The plastic card of the present invention is prepared by laminating the unstretched polyester sheets to both sides of a single sheet or a laminate of a plurality of sheets of the stretched polyester film as described above. Because the unstretched polyester sheet and the stretched polyester film are cut simultaneously when the card is worked by milling to form the cavity for embedding a chip module, the formation of burr is prevented, and the cutting can be achieved to provide a beautiful appearance.

Figure 2:
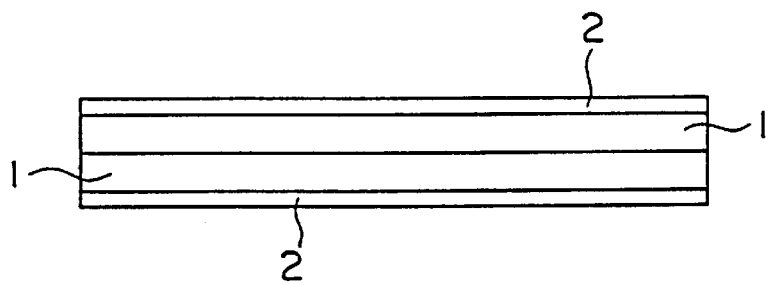
FIG. 2 shows a side view of another embodiment of the plastic card of the present invention.
Figure 3:
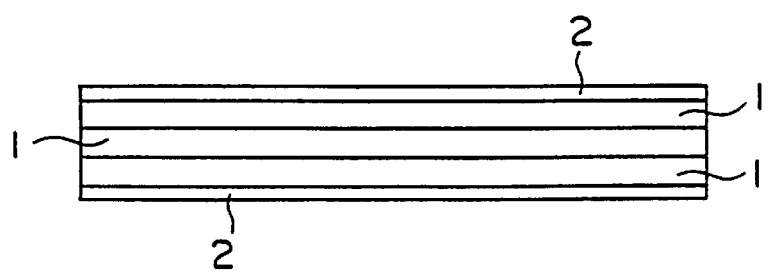
FIG. 3 shows a side view of still another embodiment of the plastic card of the present invention.
Figure 4A:
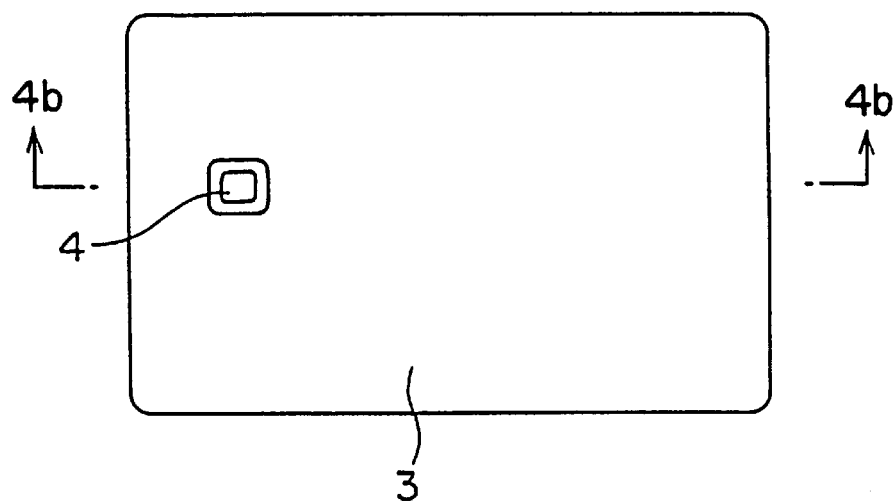
FIG. 4(a) shows a plan view of an embodiment of the plastic card of the present invention.
Figure 4B:
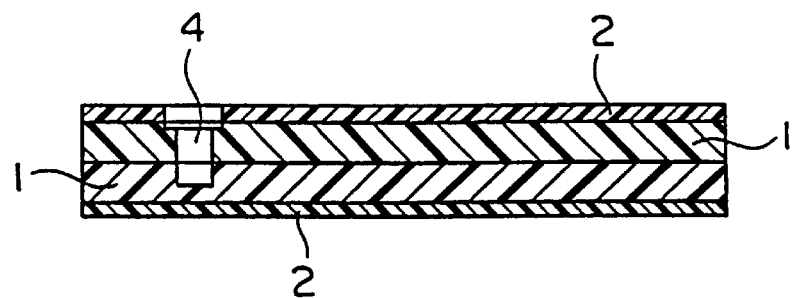
FIG. 4(b) shows a sectional view of an embodiment of the plastic card of the present invention.

FIG. 1 shows a side view of an embodiment of the plastic card of the present invention. In the plastic card shown in FIG. 1, unstretched polyester sheets 2 having a thickness of 125 $\mu$m are laminated to both sides of a polyester film 1 having a thickness of 500 $\mu$m. FIG. 2 shows a side view of another embodiment of the plastic card of the present invention. In the plastic card shown in FIG. 2, two sheets of a stretched polyester film 1 having a thickness of 275 $\mu$m are laminated together, and unstretched polyester sheets 2 having a thickness of 100 $\mu$m are laminated to both sides of the laminate of the stretched polyester film. FIG. 3 shows a side view of still another embodiment of the plastic card of the present invention. In the plastic card shown in FIG. 3, three sheets of a stretched polyester film 1 having a thickness of 188 $\mu$m are laminated together, and unstretched polyester sheets 2 having a thickness of 100 $\mu$m are laminated to both sides of the laminate of the stretched polyester film. FIG. 4(a) shows a plan view of an embodiment of the plastic card of the present invention. At a specified position of a substrate 3 which is formed to a specified shape by punching, a cavity for embedding a chip module 4 is formed by milling. FIG. 4(b) shows a sectional view of the above embodiment of the plastic card of the present invention along the 4b—4b line shown in FIG. 4(a). The milling is conducted in two steps to the depths of 150 $\mu$m and 630 $\mu$m from the surface of the card. When the milling is first conducted to the depth of 630 $\mu$m and subsequently to the depth of 150 $\mu$m in the periphery of the cavity formed by the first milling, no burr is formed at all at the cavity for embedding a chip module.

To summarize the advantages of the present invention, because the plastic card of the present invention is prepared by laminating unstretched polyester sheets on both sides of a single sheet or a laminate of a plurality of sheets of a stretched polyester film, the plastic card does not contain hazardous halogen elements, shows excellent property for printing on the surface of the stretched polyester film, has excellent physical properties, dimensional stability, and heat resistance, and does not form burr in punching and milling to form a cavity for embedding a chip module.

What is claimed is:

1. A plastic card prepared by laminating unstretched polyester sheets to both sides of a single sheet or a laminate of a plurality of sheets of stretched polyester film, cutting the obtained laminate to a shape of a card, and forming a cavity for embedding a chip module by milling process in the laminate cut to the shape of a card.

2. The plastic card of claim 1, wherein a single sheet of a stretched polyester is used.

3. The plastic card of claim 1, wherein a plurality of sheets of stretched polyester are used.

* * * * *